(12) United States Patent
Baek et al.

(10) Patent No.: US 11,818,720 B2
(45) Date of Patent: Nov. 14, 2023

(54) METHOD AND APPARATUS FOR DETERMINING TRANSMISSION TIME POINT OF TYPE 1 CONFIGURED GRANT IN WIRELESS COMMUNICATION SYSTEM

(71) Applicant: Samsung Electronics Co., Ltd., Suwon-si (KR)

(72) Inventors: Sangkyu Baek, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/088,330

(22) Filed: Nov. 3, 2020

(65) Prior Publication Data

US 2021/0144749 A1  May 13, 2021

(30) Foreign Application Priority Data

Nov. 7, 2019 (KR) .......................... 10-2019-0141793

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC ........................... H04W 72/1268; H04W 72/14
See application file for complete search history.

(56) References Cited

U.S. PATENT DOCUMENTS

| | | |
|---|---|---|
| 10,568,129 B2 | 2/2020 | Jeon et al. |
| 2019/0075563 A1* | 3/2019 | Babaei ................. H04W 72/02 |
| 2019/0253197 A1 | 8/2019 | Babaei et al. |
| 2019/0289638 A1 | 9/2019 | Kung et al. |
| 2021/0367742 A1* | 11/2021 | Marco ................. H04W 72/042 |
| 2022/0191917 A1* | 6/2022 | Fu ......................... H04W 72/14 |

FOREIGN PATENT DOCUMENTS

| | | |
|---|---|---|
| WO | 2018232321 A2 | 12/2018 |
| WO | 2020/164501 A1 | 8/2020 |

OTHER PUBLICATIONS

International Search Report of the International Searching Authority in connection with International Application No. PCT/KR2020/014198 dated Jan. 20, 2021, 3 pages.

(Continued)

*Primary Examiner* — Kevin M Cunningham

(57) ABSTRACT

The disclosure relates to a communication technique for converging an IoT technology with a 5G communication system for supporting a higher data transmission rate beyond a 4G system, and a system therefor. The disclosure may be applied to an intelligent service (for example, a smart home, a smart building, a smart city, a smart car or connected car, healthcare, digital education, retail business, a security and safety related service, or the like) based on a 5G communication technology and an IoT related technology. The disclosure provides a method and apparatus for determining a transmission time point of a type 1 configured grant in a wireless communication system.

16 Claims, 14 Drawing Sheets

(56) References Cited

OTHER PUBLICATIONS

Qualcomm Incorporated, "TSN Time Synchronization Solutions: Down-selection," S2-1903326, 3GPP TSG-SA WG2 Meeting #132, Xi'an, P.R. China, Apr. 8-12, 2019, 8 pages.

Nokia et al., "CG and SPS occasions determination for new periodicities," R2-1913454, 3GPP TSG-RAN WG2 Meeting #107bis, Chongqing, China, Oct. 14-18, 2019, 5 pages.

Supplementary European Search Report dated Sep. 9, 2022 in connection with European Patent Application No. 20 88 4569, 10 pages.

\* cited by examiner

METHOD AND APPARATUS FOR DETERMINING TRANSMISSION TIME POINT OF TYPE 1 CONFIGURED GRANT IN WIRELESS COMMUNICATION SYSTEM

CROSS-REFERENCE TO RELATED APPLICATION(S)

This application is based on and claims priority under 35 U.S.C. 119 to Korean Patent Application No. 10-2019-0141793, filed on Nov. 7, 2019, in the Korean Intellectual Property Office, the disclosure of which is herein incorporated by reference in its entirety.

BACKGROUND

1. Field

The disclosure relates to a method and apparatus for determining a transmission time point of a type 1 configured grant in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a case where a terminal performs uplink transmission for transmitting data to a base station, a method such as a configured grant may be used to perform allocation of uplink radio resources through which data is transmitted. The configured grant includes a type 1 configured grant and a type 2 configured grant, and the type 1 configured grant may be configured by a radio resource control (RRC) configuration/reconfiguration message.

The terminal determines a transmission time point of the type 1 configured grant through an RRC message. If a delay occurs in the transmission of the RRC message, it is not possible to know the exact time point at which a base station has transmitted the RRC message and thus a method for determining the transmission time point of the type 1 configured grant needs to be defined.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and apparatus for determining a transmission time point of a type 1 configured grant.

In order to solve the above problem, a method by a terminal in a wireless communication system according to an embodiment is provided, the method including: receiving, from a base station, configuration information on a configured grant including first information on an offset; identifying a resource for initializing the configured grant based on the configuration information; and starting an uplink transmission for the configured grant in the identified resource, wherein the resource is identified, based on the offset and a system frame number used for determination of the offset in a time domain, and wherein, in case that the configuration information further includes second information on a time reference system frame number, the system frame number is determined based on a number indicated by the second information.

Further, a method by a base station in a wireless communication system according to an embodiment may include: transmitting, to a terminal, configuration information on a configured grant including first information on an offset; and receiving, an uplink grant for the configured grant started in a resource, wherein the resource is determined based on the offset and a system frame number used for determination of the offset in a time domain, and wherein, in case that the configuration information further includes second information on a time reference system frame number, the system frame number is determined based on a number indicated by the second information.

Furthermore, a terminal in a wireless communication system according to an embodiment may include a transceiver; and a controller configured to: control the transceiver to receive, from a base station, configuration information on a configured grant including first information on an offset; identify a resource for initializing the configured grant based on the configuration information; and start an uplink transmission for the configured grant in the identified resource, wherein the resource is identified, based on the offset and a system frame number used for determination of the offset in a time domain, and wherein, in case that the configuration information further includes second information on a time reference system frame number, the system frame number is determined based on a number indicated by the second information.

In addition, a base station in a wireless communication system according to an embodiment may include a transceiver; and controller configured to: control the transceiver to transmit, to a terminal, configuration information on a configured grant including first information on an offset; and control the transceiver to receive, an uplink grant for the configured grant started in a resource, wherein the resource is determined based on the offset and a system frame number used for determination of the offset in a time domain, and wherein, in case that the configuration information further includes second information on a time reference system frame number, the system frame number is determined based on a number indicated by the second information.

An embodiment provides a clear reference for a system frame number (SFN=0), with reference to which an offset value is to be applied, even in a case where the periodicity of the type 1 configured grant is configured as a value other than a divisor of the periodicity of a frame for which an SFN is 0 (SFN=0).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
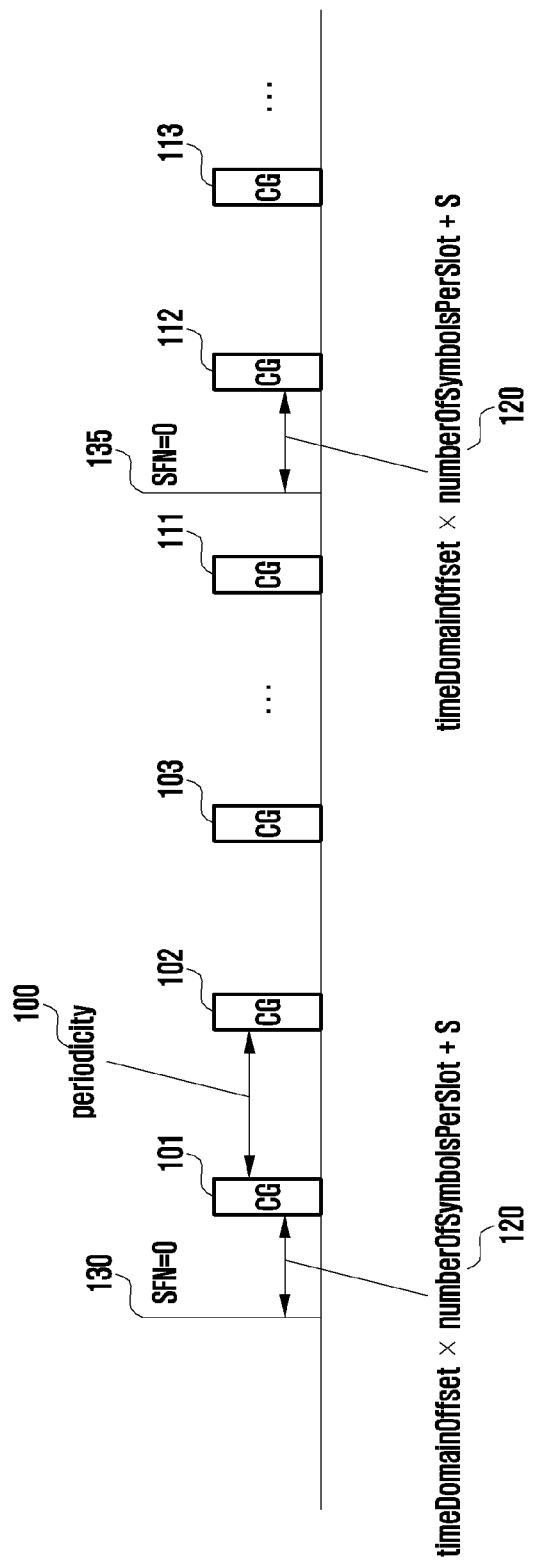
FIG. 1 illustrates a scenario in which a type 1 configured grant is configured.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In describing the disclosure, a detailed description of known relevant functions or configurations incorporated herein will be omitted when it may make the subject matter of the disclosure unnecessarily unclear. Hereinafter, embodiments of the disclosure will be described with reference to the accompanying drawings.

FIG. 1 illustrates a scenario in which a type 1 configured grant is configured.

In a case where a terminal performs uplink transmission for transmitting data to a base station, two types of methods, such as a dynamic grant (DG) and a configured grant (CG), are used to perform allocation of uplink radio resources through which data is transmitted. The DG refers to a method in which radio resources are allocated using DCI format of a physical downlink control channel (PDCCH). Here, the PDCCH resource is scrambled by a radio network temporary identifier (RNTI) and transmitted, and the RNTI may be divided into a connected-RNTI (C-RNTI), a configured scheduling-RNTI (CS-RNTI), and the like according to a use thereof. The resources allocated by the C-RNTI may be used for initial transmission and retransmission for a normal dynamic grant. The resource allocated by the CS-RNTI may be a retransmission resource of a configured grant, or may indicate activation or deactivation of a type 2 configured grant.

The configured grant refers to resources 101, 102, 103, 111, 112, and 113 repeating at a predetermined periodicity 100 on a time axis. Once the configured grant is configured and activated, the configured radio resources are repeated until a separate deactivation or release time point arrives. The configured grant may include a type 1 configured grant and a type 2 configured grant.

The type 1 configured grant refers to a configured grant in which all resource configurations as well as the periodicity of the configured grant are configured by an RRC configuration message. The type 1 configured grant does not include separate activation and deactivation procedures, the type 1 configured grant is assumed to be activated when configuration is performed by an RRC configuration/reconfiguration message, which is transmitted to a terminal by a base station, and the type 1 configured grant is deactivated when the configuration is released.

The type 2 configured grant refers to a configured grant in which only some pieces of information, such as a periodicity and a CG Index, are configured by the RRC configuration message in advance, and which is activated and deactivated by downlink control information (DCI) allocated by CS-RNTI.

A time point (occasion) at which the type 1 configured grant is transmitted is determined by a configured periodicity 100 and an offset value 120. The offset is a value indicating a distance apart from start time points 130 and 135 of a frame for which a system frame number (SFN) is 0 (SFN=0). Specifically, the offset value may be determined by a sum 120 of a time domain offset (timeDomainOffset) value, configured by the RRC configuration/reconfiguration message, and an S value, which is a symbol length for a transmission time point configured by the physical layer standard. In the embodiment illustrated in FIG. 1, assuming that the unit of the time domain offset value is a slot and the unit of the S value is a symbol, the offset value is obtained by multiplying the time domain offset by the number of symbols for each slot (numberOfSymbolPerSlot) and then adding S thereto.

Here, if the periodicity of the type 1 configured grant is configured as a divisor value of a time length by which a frame for which an SFN (SFN=0) is repeated, a length (offset value) from a start time point of every frame, SFN of which is 0 (SFN=0), to the first type 1 configured grant resource may have a constant value, i.e. (timeDomainOffset×numberOfSymbolsPerSlot+S). For example, in a 5G communication system, when a frame for which an SFN (SFN=0) is repeated every 10.24 seconds and the periodicity of the type 1 configured grant is a divisor of the number of slots for 10.24 seconds, a constant offset value may be obtained.

Figure 2:
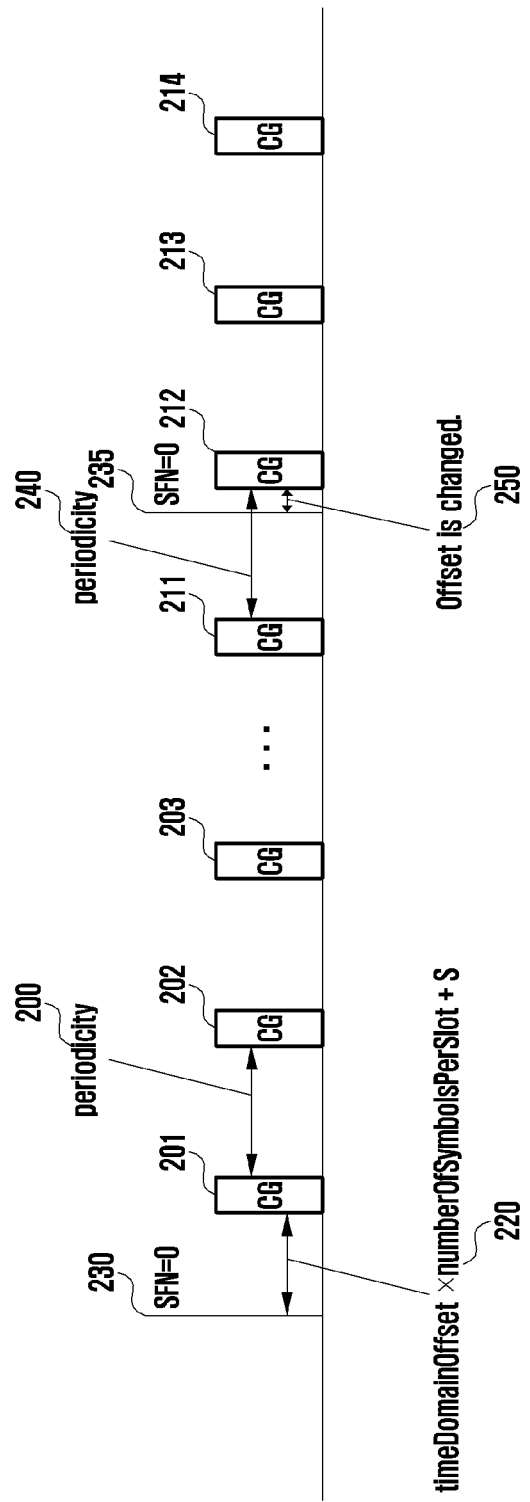
FIG. 2 illustrates a scenario in which a type 1 configured grant is configured.

FIG. 2 illustrates a scenario in which a type 1 configured grant is configured.

In a case where a terminal performs uplink transmission for transmitting data to a base station, two types of methods, such as a dynamic grant (DG) and a configured grant (CG) are used to perform allocation of uplink radio resources through which data is transmitted.

DG refers to a method in which radio resources are allocated using a DCI format of a physical downlink control channel (PDCCH). Here, the PDCCH resource is scrambled by a radio network temporary identifier (RNTI) and transmitted, and the RNTI may be divided into a connected-RNTI (C-RNTI), a configured scheduling-RNTI (CS-RNTI), and the like according to a use thereof. The resources allocated by C-RNTI may be used for initial transmission and retransmission for a normal dynamic grant. The resource allocated by the CS-RNTI may be a retransmission resource of a configured grant, or may indicate activation or deactivation of a type 2 configured grant.

The configured grant refers to resources 201, 202, 203, 211, 212, 213, and 214 repeating at a predetermined periodicity 100 on a time axis. Once the configured grant is configured and activated, the configured radio resources are repeated until a separate deactivation or release time point arrives.

The configured grant may include a type 1 configured grant and a type 2 configured grant. The type 1 configured grant refers to a configured grant in which all resource configurations as well as the periodicity of the configured grant are configured by an RRC configuration message.

The type 1 configured grant does not include separate activation and deactivation procedures, the type 1 configured grant is assumed to be activated when configuration is performed by an RRC configuration/reconfiguration message, which is transmitted to a terminal by a base station, and the type 1 configured grant is deactivated when the configuration is released.

The type 2 configured grant refers to a configured grant in which only some pieces of information, such as a periodicity and a CG Index, are configured by an RRC configuration message in advance, and which is activated and deactivated by DCI allocated by CS-RNTI.

A time point (occasion) at which the type 1 configured grant is transmitted is determined by configured periodicities 200 and 240 and an offset value 220. The offset is a value indicating a distance apart from the start time point 230 of a frame for which a specific system frame number (SFN) is 0. Specifically, the offset value may be determined by the value 220 obtained by the sum of a time domain offset (timeDomainOffset) value, configured by the RRC configuration/reconfiguration message, and an S value, which is a symbol length for a transmission time point configured by the physical layer standard. In the embodiment illustrated in FIG. 2, assuming that the unit of the time domain offset value is a slot and the unit of the S value is a symbol, the offset value is obtained by multiplying the time domain offset by the number of symbols for each slot (numberOfSymbolPerSlot) and then adding S thereto.

Here, if the periodicity of the type 1 configured grant is configured as a value other than a divisor value of a time length by which an SFN (SFN=0) is repeated, the length (offset value) from the next SFN start time point (SFN=0) 235 to the first type 1 configured grant resource may have a length 250 different from the value 220, i.e. (timeDomainOffset×numberOfSymbolsPerSlot+S). This problem may occur because the periodicity 240 of the type 1 configured grant is constantly applied regardless of the SFN start time point (SFN=0).

For example, in a 5G communication system, in a case where a frame for which the SFN is 0 (SFN=0) is repeated every 10.24 seconds and the periodicity of the type 1 configured grant is 1 second, the offset always changes because 1 second is not a divisor of 10.24 seconds. As shown in FIG. 2, a base station may configure whether to change an offset from a time point at which the SFN is 0 (SFN=0) in order to make the periodicities 200 and 240 of the type 1 configured grant to be constant. For example, the constant periodicities may be applied only when the continuous indicator (ContinueIndicator) is configured, and if not, the offset may be applied equally to every SFN start time point (SFN=0).

Figure 3:
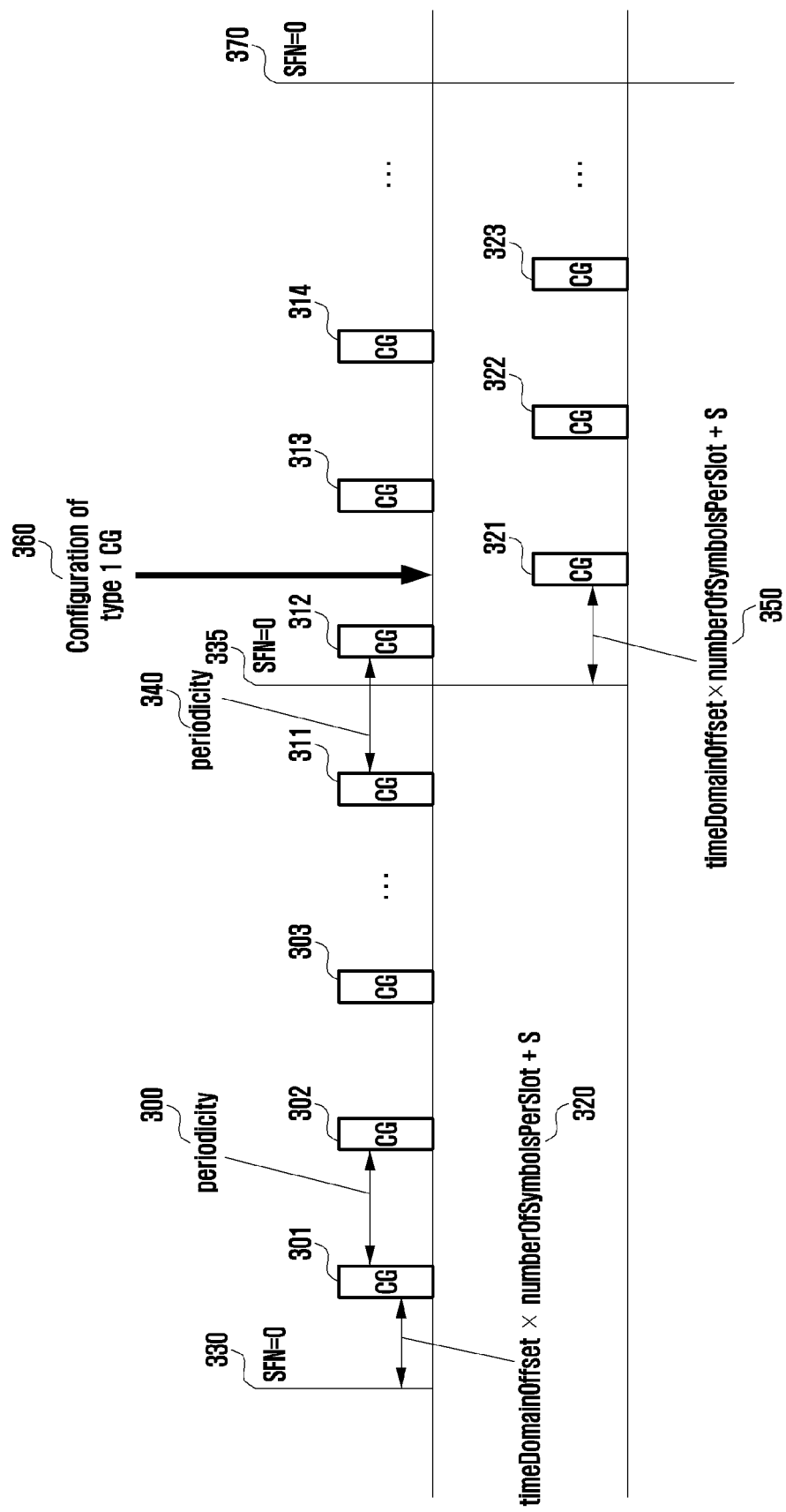
FIG. 3 illustrates a scenario in which a type 1 configured grant is analyzed differently.

FIG. 3 illustrates a scenario in which a type 1 configured grant is analyzed differently.

In the embodiment illustrated in FIG. 3, it is assumed that configuration of the type 1 configured grant is received after the second SFN start time point (SFN=0) 335 (indicated by reference numeral 360). However, this time point is a reference time point at which the terminal configures the type 1 configured grant, and is not a time point at which the base station transmits the corresponding configuration message.

More specifically, the type 1 configured grant may be configured by an RRC configuration/reconfiguration message, and this RRC message may cause a delay of several hundred milliseconds (ms) or more due to retransmission of a hybrid automatic repeat request (HARQ) or an automatic repeat request (ARQ). Due to the delay, the RRC configuration/reconfiguration message, which has been transmitted before the second SFN start time point (SFN=0) 335, may be transmitted after second SFN start time point (SFN=0) (as indicated by reference numeral 360). Since a reception RRC layer of a terminal may not accurately know a time point at which the base station ha transmitted the corresponding message, the reception RRC layer may not know whether the corresponding configuration message is transmitted before or after the second SFN start time point (SFN=0). In addition, when the periodicity of the type 1 configured grant is not a divisor of 10.24 seconds, the actual transmission time point of the type 1 configured grant may change according to an SFN start time point (SFN=0), with reference to which the offsets 320 and 350 are applied (indicated by reference numerals 312, 313, 314, 321, or 322).

For example, if the terminal determines such that the base station has transmitted the RRC configuration/reset message before the second SFN start time point (SFN=0), and thus it is determined that the base station has transmitted the RRC configuration/reconfiguration message after the first SFN start time point (SFN=0) 330, the transmission time point of the type 1 configured grants, indicated by reference numerals 312, 313, and 314, may be applied. Otherwise, as an example, if it is determined that the RRC configuration/reconfiguration message has been transmitted after the second SFN start time point (SFN=0) 335, the transmission time point of the type 1 configured grants, indicated by reference numerals 321, 322, and 323, may be applied. In another embodiment, the offset may be applied to an SFN start time point (SFN=0) 370 that arrives after the time point 360 at which configuration of the type 1 configured grant is received and applied.

Figure 4:
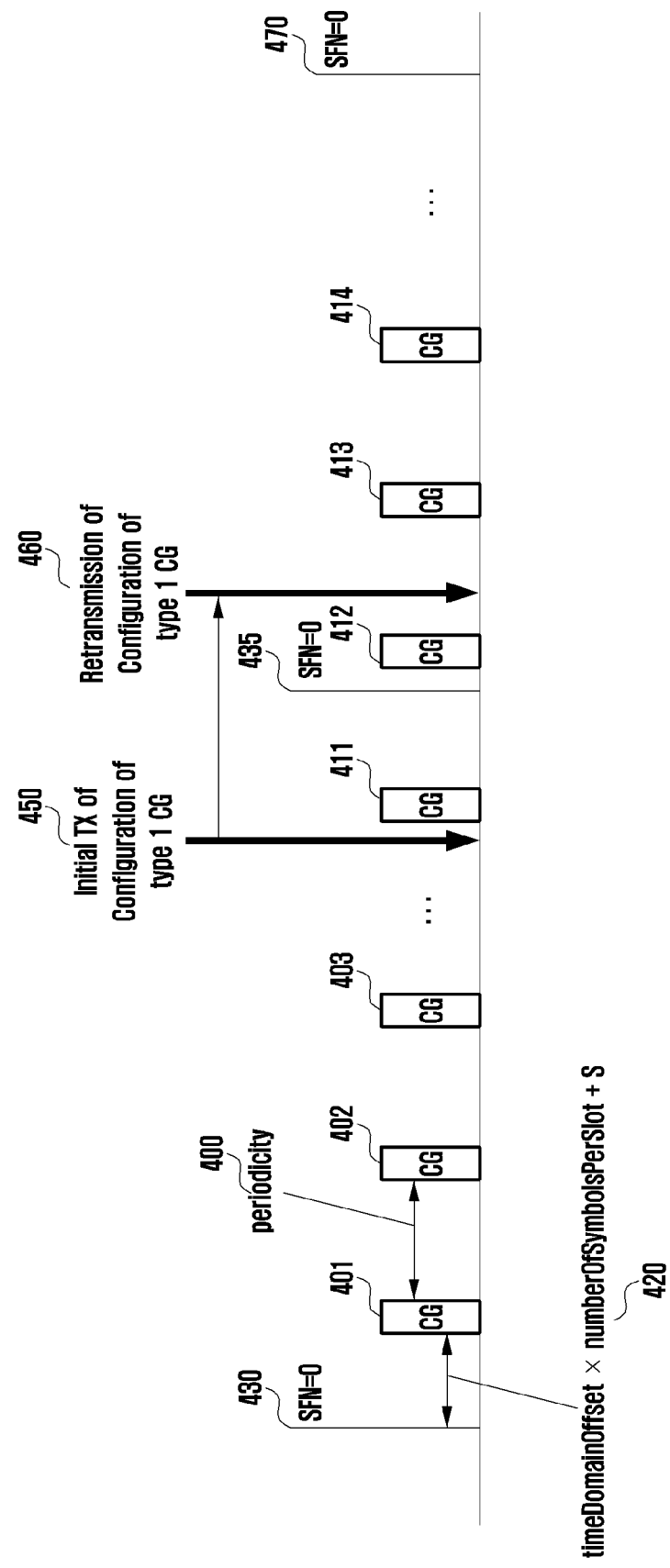
FIG. 4 illustrates a scenario in which a type 1 configured grant is analyzed differently due to retransmission.

FIG. 4 illustrates a scenario in which a type 1 configured grant is analyzed differently due to retransmission.

In the embodiment illustrated in FIG. 4, it is assumed that configuration of the type 1 configured grant is received (indicated by reference numeral 460) after a second SFN start time point (SFN=0) 435. However, this time point is a reference time point at which a terminal configures the type 1 configured grant, and is not a time point 450 at which a base station transmits the corresponding configuration message.

The type 1 configured grant may be configured by an RRC configuration/reconfiguration message, and the RRC message may cause a delay of several hundred milliseconds (ms) or more due to retransmission of a hybrid automatic repeat request (HARQ) or an automatic repeat request (ARQ). Due to the delay, the RRC configuration/reconfiguration message, which has been transmitted (as indicated by reference numeral 450) before the second SFN start time point (SFN=0) 435, may be transmitted (as indicated by reference numeral 460) after the second SFN start time point (SFN=0).

Since a reception RRC layer of a terminal may not accurately know a time point at which the base station transmits the corresponding message, the reception RRC layer may not know whether the corresponding configuration message is transmitted before or after the second SFN start time point (SFN=0). In addition, when the periodicity of the type 1 configured grant is not a divisor of 10.24 seconds, the actual transmission time point of the type 1 configured grant may change according to an SFN start time point (SFN=0), with reference to which an offset 420 is applied.

For example, if the terminal determines such that the base station has transmitted the RRC configuration/reset message before the second SFN start time point (SFN=0), and thus it is determined that the base station has transmitted the RRC configuration/reconfiguration message after the first SFN start time point (SFN=0) 330, the transmission time point of the type 1 configured grants, indicated by reference numerals 401, 402, 403, 411, 412, and 413, may be applied. Otherwise, if it is determined that the RRC configuration/reconfiguration message has been transmitted after the second SFN start time point (SFN=0) 435, an offset may be applied to the second SFN start time point (SFN=0). In another embodiment, the offset may be applied to an SFN start time point (SFN=0) 470 that arrives after the time point 460 at which configuration of the type 1 configured grant is received and applied.

Figure 5:
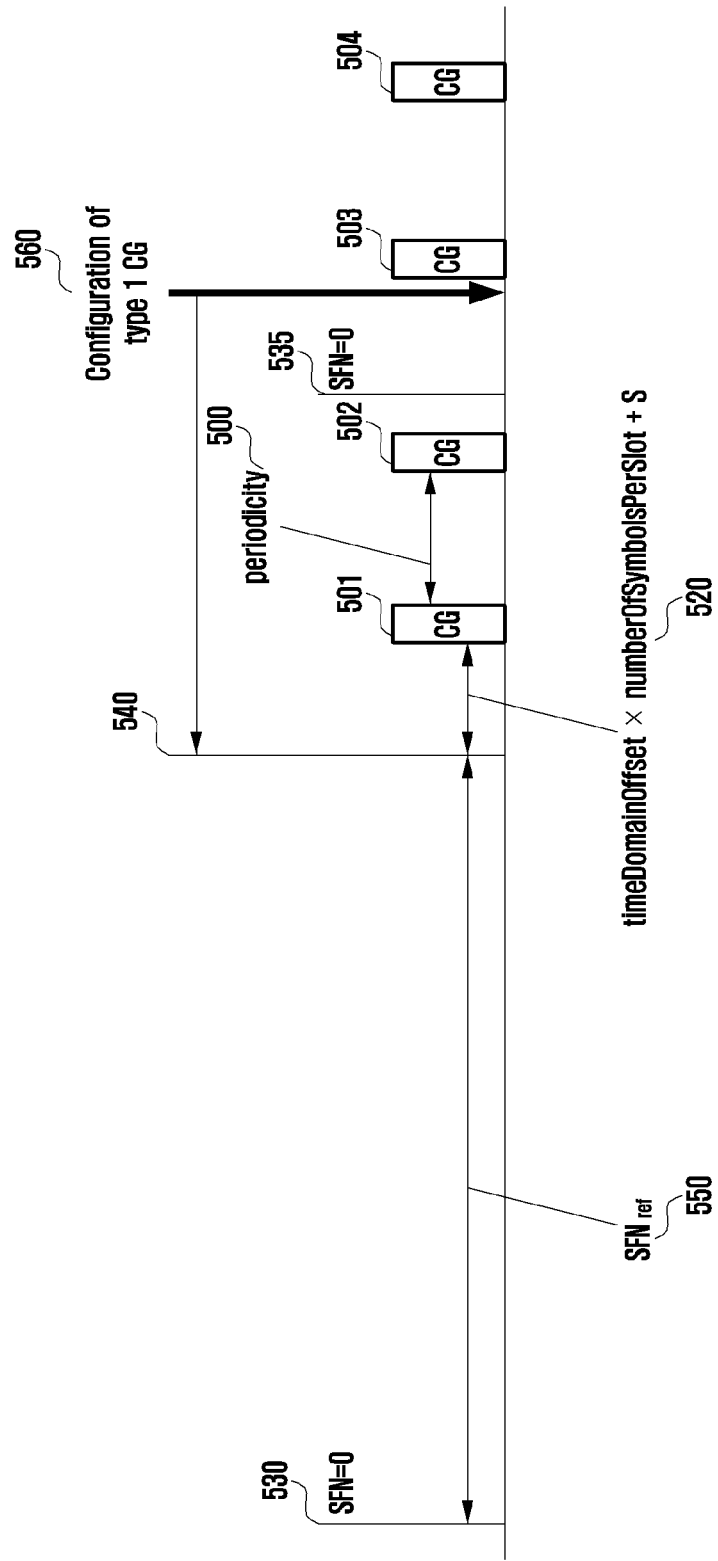
FIG. 5 illustrates a reference SFN application method proposed in the disclosure.

FIG. 5 illustrates a reference SFN application method proposed in the disclosure.

As described in FIGS. 2, 3, and 4, if a time point 560 at which a terminal applies the type 1 configured grant is adjacent to an SFN start time point (SFN=0) 535, an SFN start time point (SFN=0) applied by the terminal may differ from a time point configured by a base station. This problem may occur because an offset 520 is always applied based on the SFN start time point (SFN=0).

In order to prevent this problem, the terminal may explicitly configure a reference time point at which an offset of the type 1 configured grant is applied. The embodiment illustrated in FIG. 5 indicates a method in which a value of the reference SFN (SFNref) is configured (indicated by reference numeral 550) and the offset 520 is applied from an SFN start time point 540 of the reference SFN value other than the time point of the SFN (SFN=0). In a case where the base station configures the type 1 configured grant for the terminal through an RRC configuration/reconfiguration message, the reference SFN value may be included in the RRC configuration/reconfiguration message and transmitted together. However, in another embodiment, the reference SFN value may be included in DCI or a medium access control-control element (MAC CE) and transmitted to the terminal.

If the reference SFN is configured, the terminal may apply the offset 520, i.e. the value of (timeDomainOffset×numberOfSymbolsPerSlot+S), based on an SFN start time point (in another example, an SFN end time point) having a reference SFN value of the closest past time point with reference to the time point 560 at which configuration of the type 1 configured grant is performed, and then may determine transmission time points 501, 502, 503, and 504 of the type 1 configured grant at every predetermined periodicity 500. The reference SFN value may be determined, by the base station, by considering HARQ and ARQ retransmission of the RRC configuration/reconfiguration message.

Here, the transmission time point of the N-th type 1 configured grant (N is a non-negative integer value) may satisfy the following equation.

$$[(SFN \times numberOfSlotsPerFrame \times numberOfSymbolsPerSlot)+(\text{slot number in the frame} \times numberOfSymbolsPerSlot)+\text{symbol number in the slot}] = (SFNref+timeDomainOffset \times numberOfSymbolsPerSlot+S+N \times periodicity) \bmod (1024 \times numberOfSlotsPerFrame \times numberOfSymbolsPerSlot) \qquad \text{<Equation 1>}$$

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, "symbol number in the slot" is the symbol number in the slot, and SFNref is a value indicating the reference SFN and the value is indicated in a unit of slots.

In <Equation 1>, it has been assumed that there are 1024 frames, each frame has a length of 10 ms, and the unit of periodicity is a symbol. However, even if a unit is changed or an offset value added as a constant occurs according to embodiments, the subject matter of the disclosure can be applied in the same manner.

Considering <Equation 1>, a transmission time point of the 0th (N=0) configured grant may be the transmission time point 501, a transmission time point of the first (N=1) configured grant may be the transmission time point 502, and a transmission time point of the second (N=2) configured grant may be the transmission time point 503, and the like. By applying the manner discussed above, the terminal can constantly determine a transmission time point of the type 1 configured grant even if the offset length from the SFN start time point (SFN=0) is changed. In this case, the type 1 configured grant transmission time points 501 and 502 prior to the time point 560 at which the configuration of the type 1 configured grant is performed may not be actually used. In this case, the type 1 configured grant for which a frame number is 2 (N=2) and a transmission time point is the time point 503 may be actually used first.

Here, since the terminal configures the type 1 configured grant at the time point 560, the type 1 configured grant actually used for transmission may be a type 1 configured grant resource applied after the time point 560. The transmission time point of the 0th (N=0) type 1 configured grant may be defined based on actually usable resources, and thereafter, the transmission time point of the Nth type 1 configured grant may satisfy the following equation.

$$[(SFN \times numberOfSlotsPerFrame \times numberOfSymbolsPerSlot)+(\text{slot number in the frame} \times numberOfSymbolsPerSlot)+\text{symbol number in the slot}] = (SFNref+timeDomainOffset \times numberOfSymbolsPerSlot+S+(N+m) \times periodicity) \bmod (1024 \times numberOfSlotsPerFrame \times numberOfSymbolsPerSlot) \qquad \text{<Equation 2-1>}$$

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

$$[(SFN \times numberOfSlotsPerFrame \times numberOfSymbolsPerSlot)+(\text{slot number in the frame} \times numberOfSymbolsPerSlot)+\text{symbol number in the slot}] = (SFNref+timeDomainOffset \times numberOfSymbolsPerSlot+S+m \times periodicity) \bmod (1024 \times numberOfSlotsPerFrame \times numberOfSymbolsPerSlot) \qquad \text{<Equation 2-2>}$$

In the embodiment illustrated in FIG. 5, the SFN, the slot number in the frame, and the symbol number in the slot for the transmission time point of the first configured grant after the time point at which configuration of the type 1 configured grant is performed satisfy a condition "m=2".

As shown in FIG. 5, a base station may configure whether to change an offset from a time point at which the SFN is 0 (SFN=0) in order to make the periodicity 500 of the type 1 configured grant to be constant. For example, the constant periodicity may be applied only when a continuous indicator (ContinueIndicator) is configured, and if not, the offset may be applied equally to every SFN start time point (SFN=0).

Figure 6:
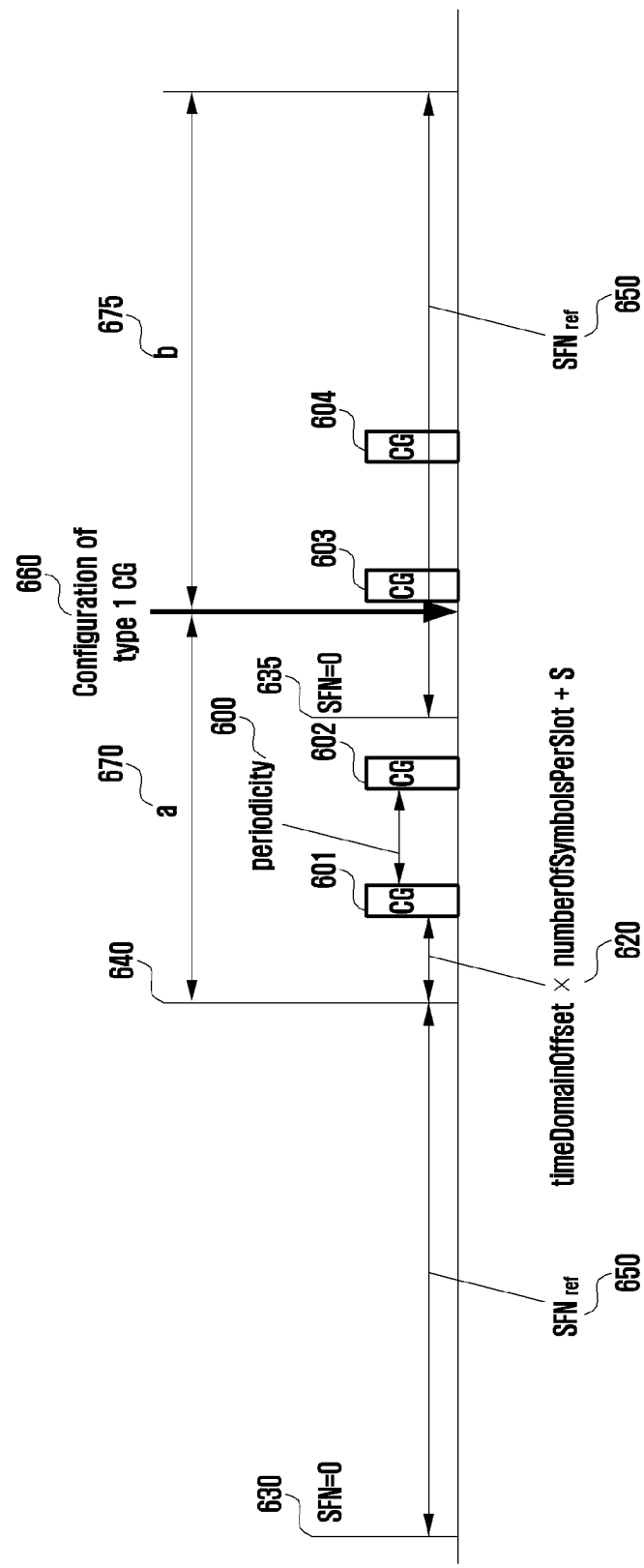
FIG. 6 illustrates a reference SFN application method proposed in the disclosure.

FIG. 6 illustrates a reference SFN application method proposed in the disclosure.

As described in FIGS. 2, 3, and 4, if a time point 660 at which a terminal applies the type 1 configured grant is adjacent to an SFN start time point (SFN=0) 635, the SFN start time point (SFN=0) applied by the terminal may differ from a time point configured by a base station. This problem may occur because an offset 620 is always applied based on the SFN start time point (SFN=0).

In order to prevent this problem, the terminal may explicitly configure a reference time point at which an offset of the type 1 configured grant is applied. The embodiment illustrated in FIG. 6 indicates a method in which a reference SFN value (SFNref) is configured (indicated by reference numeral 650) and the offset 620 is applied from an SFN start time point 640 of the reference SFN value other than the time point of the SFN (SFN=0). In a case where the base station configures the type 1 configured grant for the terminal through an RRC configuration/reconfiguration message, the reference SFN value may be included in the RRC configuration/reconfiguration message and transmitted. However, in another embodiment, the reference SFN value may be included in DCI or medium access control-control element (MAC CE) and transmitted to the terminal.

If the reference SFN is configured, the terminal may apply the offset 620, i.e. the value of (timeDomainOffset×numberOfSymbolsPerSlot+S), based on an SFN start time point (in another example, an SFN end time point) having a reference SFN value of the nearest past time point or future time point with reference to the time point 660 at which the type 1 configured grant is configured, and then may determine transmission time points 601, 602, 603, and 604 of the type 1 configured grant at every predetermined periodicity 600. In this case, by comparing distances 670 and 675 from a time point, at which the type 1 configured grant is configured, to a start time point or end time point of a reference SFN, a start or end time point of a reference SFN, which is nearer to the time point at which the type 1 configured grant is configured, may be determined. In the embodiment illustrated in FIG. 6, it is assumed that the past time point 640 is determined to be nearer to the time point at which the type 1 configured grant is configured. The reference SFN value may be determined, by the base station, by considering HARQ and ARQ retransmission of the RRC configuration/reconfiguration message.

Here, the transmission time point of the N-th type 1 configured grant (N is a non-negative integer value) may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (SFNref + timeDomainOffset \times numberOfSymbolsPerSlot + S + N \times periodicity) \bmod (1024 \times numberOfSlotsPerFrame \times numberOfSymbolsPerSlot) \quad \text{<Equation 3>}$$

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, "symbol number in the slot" is the symbol number in the slot, and SFNref is a value indicating the reference SFN and the value is indicated in a unit of slots. That is, the SFNref may be indicated as a value obtained by multiplying the reference SFN value by the number of symbols for each frame. More specifically, the SFNref may be indicated as a value obtained by multiplying the reference SFN value by the number of slots for each frame and the number of symbols for each slot.

In <Equation 3>, it has been assumed that there are 1024 frames, each frame has a length of 10 ms, and the unit of periodicity is a symbol. However, even if a unit is changed or an offset value added as a constant value occurs according to embodiments, the subject matter of the disclosure can be applied in the same manner.

Considering <Equation 3>, a transmission time point of the 0th (N=0) configured grant may be the transmission time point 601, a transmission time point of the first (N=1) configured grant may be the transmission time point 602, and a transmission time point of the second (N=2) configured grant may be the transmission time point 603, and the like. By applying the manner discussed above, the terminal can constantly determine a transmission time point of the type 1 configured grant even if the offset length from the SFN start time point (SFN=0) is changed. In this case, the type 1 configured grant transmission time points 601 and 602 prior to the time point 660 at which configuration of the type 1 configured grant is performed may not be actually used. In this case, the type 1 configured grant for which a frame number is 2 (N=2) and a transmission time point is the time point 603 may be actually used first.

Here, since the terminal identifies the time point 660 at which configuration of the type 1 configured grant is performed, the type 1 configured grant actually used for transmission may be a type 1 configured grant resource applied after the time point 660. The transmission time point of the 0th (N=0) type 1 configured grant may be defined based on actually usable resources, and thereafter, the transmission time point of the Nth type 1 configured grant may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (SFNref + timeDomainOffset \times numberOfSymbolsPerSlot + S + (N+m) \times periodicity) \bmod (1024 \times numberOfSlotsPerFrame \times numberOfSymbolsPerSlot) \quad \text{<Equation 4-1>}$$

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (SFNref + timeDomainOffset \times numberOfSymbolsPerSlot + S + m \times periodicity) \bmod (1024 \times numberOfSlotsPerFrame \times numberOfSymbolsPerSlot) \quad \text{<Equation 4-2>}$$

In the embodiment illustrated in FIG. 6, the SFN, the slot number in the frame, and the symbol number in the slot for the transmission time point of the first configured grant after the time point at which configuration of the type 1 configured grant is performed satisfy a condition "m=2".

As shown in FIG. 6, a base station may configure whether to change the offset from a time point at which the SFN is 0 (SFN=0) in order to make the periodicity 600 of the type 1 configured grant to be constant. For example, the constant periodicity may be applied only when the continuous indicator (ContinueIndicator) is configured, and if not, the offset may be applied equally to every SFN start time point (SFN=0).

Figure 7:
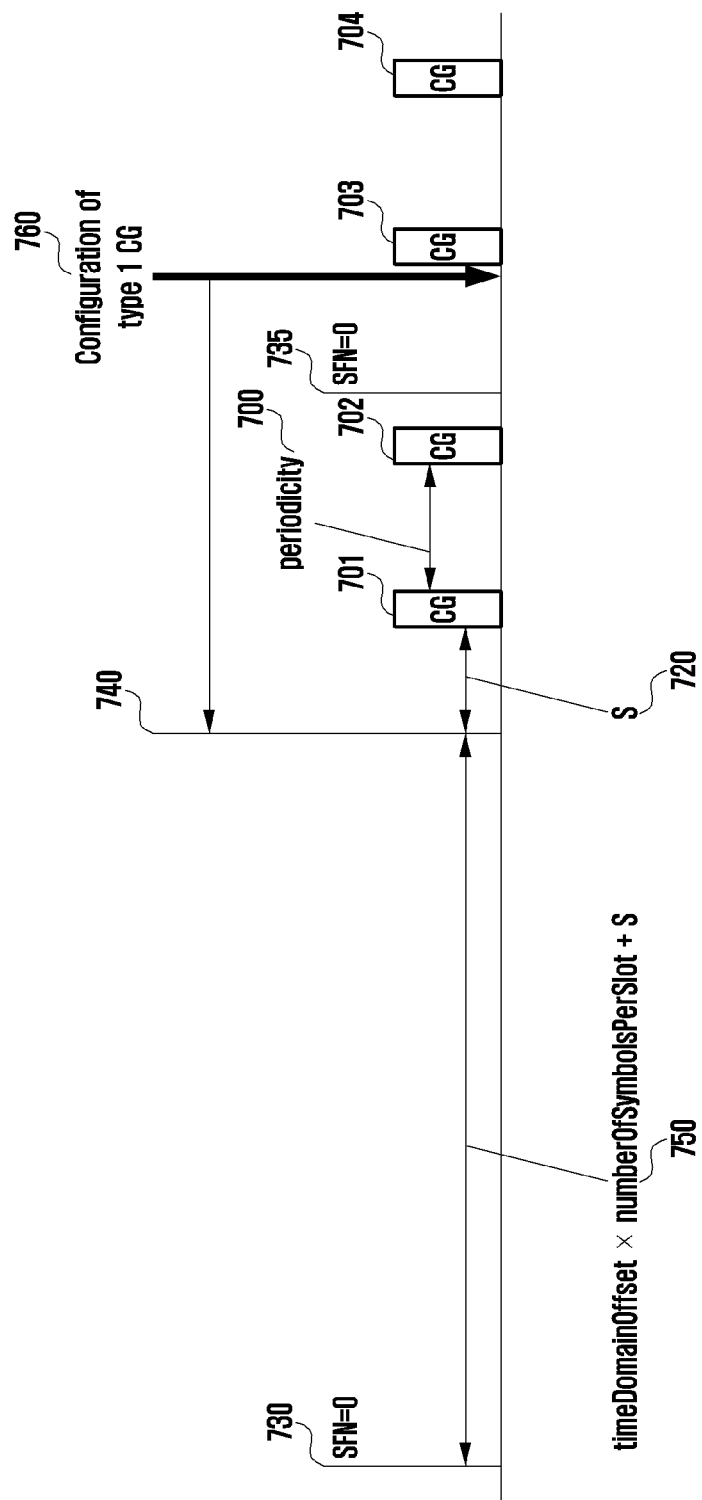
FIG. 7 illustrates a reference time application method proposed in the disclosure.

FIG. 7 illustrates a reference time application method proposed in the disclosure.

As described in FIGS. 2, 3, and 4, if a time point 760 at which a terminal applies the type 1 configured grant is adjacent to an SFN start time point (SFN=0) 735, the SFN start time point (SFN=0) applied by the terminal may differ from a time point configured by a base station. This problem may occur because an offset 720 is always applied based on the SFN start time point (SFN=0).

In order to prevent this problem, the terminal may explicitly configure a time point 740 indicated by a time domain offset as a reference time point at which an offset of the type 1 configured grant is applied. The embodiment illustrated in FIG. 7 relates to a method of applying a symbol offset S at a time 750, indicated by a time domain offset, rather than a time point at which the SFN is 0 (SFN=0). To this end, a range in which the timeDomainOffset value is configurable needs to be extended according to the periodicity in which the SFN (SFN=0) is repeated. Here, the terminal may apply an offset 720, i.e., an S value, based on a time point 740 indicated by a time-domain offset of the nearest past time point with reference to the time point 760 at which the type 1 configured grant is configured, and then may determine transmission time points 701, 702, 703, and 704 of the type 1 configured grant at every predetermined periodicity 700. The time-domain offset value may be determined, by the base station, by considering HARQ and ARQ retransmission of the RRC configuration/reconfiguration message.

Here, the transmission time point of the N-th type 1 configured grant (N is a non-negative integer value) may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) \bmod (1024 \times numberOfSlotsPerFrame \times numberOfSymbolsPerSlot) \quad <\text{Equation 5}>$$

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, and "symbol number in the slot" is the symbol number in the slot. In <Equation 5>, it has been assumed that there are 1024 frames, each frame has a length of 10 ms, and the unit of periodicity is a symbol. However, even if a unit is changed or an offset value added as a constant occurs according to embodiments, the subject matter of the disclosure can be applied in the same manner.

Considering <Equation 5>, a transmission time point of the 0th (N=0) configured grant may be the transmission time point 701, a transmission time point of the first (N=1) configured grant may be the transmission time point 702, and a transmission time point of the second (N=2) configured grant may be the transmission time point 703, and the like. By applying the manner discussed above, the terminal can constantly determine a transmission time point of the type 1 configured grant even if the offset length from the SFN start time point (SFN=0) is changed. In this case, the type 1 configured grant transmission time points 701 and 702 prior to the time point 760 at which configuration of the type 1 configured grant is performed may not be actually used. In this case, the type 1 configured grant for which a frame number is 2 (N=2) and a transmission time point is the time point 703 may be actually used first.

Here, since the terminal identifies the time point 760 at which configuration of the type 1 configured grant is performed, the type 1 configured grant actually used for transmission may be a type 1 configured grant resource applied after the time point 760. The transmission time point of the 0th (N=0) type 1 configured grant may be defined based on actually usable resources, and thereafter, the transmission time point of the Nth type 1 configured grant may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (SFNref + timeDomainOffset \times numberOfSymbolsPerSlot + S + (N+m) \times periodicity) \bmod (1024 \times numberOfSlotsPerFrame \times numberOfSymbolsPerSlot) \quad <\text{Equation 6-1}>$$

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + m \times periodicity) \bmod (1024 \times numberOfSlotsPerFrame \times numberOfSymbolsPerSlot) \quad <\text{Equation 6-2}>$$

In the embodiment illustrated in FIG. 7, the SFN, the slot number in the frame, and the symbol number in the slot for the transmission time point of the first configured grant after the time point at which configuration of the type 1 configured grant is performed satisfy a condition "m=2".

As shown in FIG. 7, a base station may configure whether to change the offset from a time point at which the SFN is 0 (SFN=0) in order to make the periodicity 700 of the type 1 configured grant to be constant. For example, the constant periodicity may be applied only when the continuous indicator (ContinueIndicator) is configured, and if not, the offset may be applied equally to every SFN start time point (SFN=0).

Figure 8:
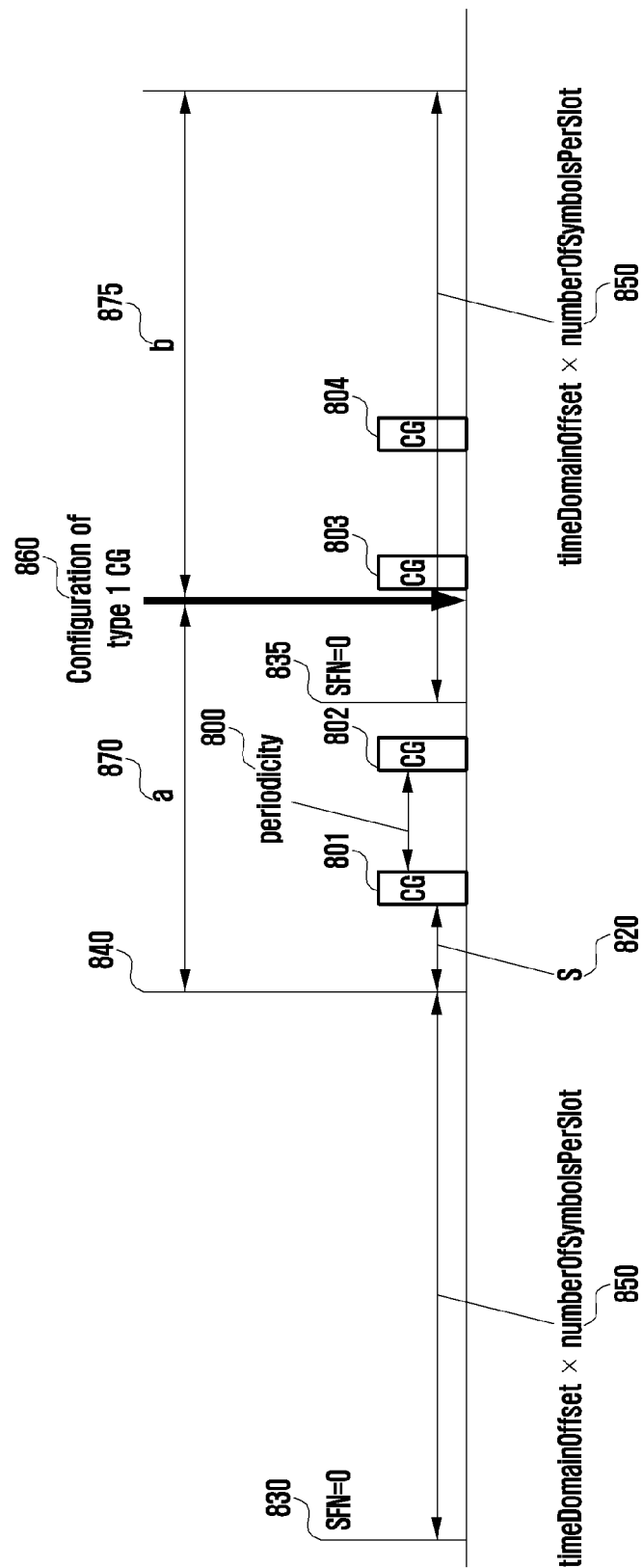
FIG. 8 illustrates a reference SFN application method proposed in the disclosure.

FIG. 8 illustrates a reference SFN application method proposed in the disclosure.

As described in FIGS. 2, 3, and 4, if a time point 860 at which a terminal applies the type 1 configured grant is adjacent to an SFN start time point (SFN=0) 835, the SFN start time point (SFN=0) applied by the terminal may differ from a time point configured by a base station. This problem may occur because an offset 820 is always applied based on the SFN start time point (SFN=0).

In order to prevent this problem, the terminal may explicitly configure a time point 840 indicated by a time domain offset, as a reference time point at which an offset of the type 1 configured grant is applied. The embodiment illustrated in FIG. 8 related to a method of applying a symbol offset S at a time 850, indicated by the time domain offset, rather than a time point at which the SFN is 0 (SFN=0). To this end, a range in which the timeDomainOffset value is configurable needs to be extended according to the periodicity in which the SFN (SFN=0) is repeated. Here, the terminal may apply an offset 820, i.e., an S value, based on a time point indicated by a time-domain offset of the nearest past time point or future time point with reference to the time point 860 at which the type 1 configured grant is configured, and then may determine transmission time points 801, 802, 803, and 804 of the type 1 configured grant at every predetermined periodicity 800.

In this case, by comparing distances 870 and 875 from a time point, at which configuration of the type 1 configured grant is performed, to a time point indicated by the time-domain offset, a time point, which is indicated by a time-domain offset of the time point nearer to the time point at which the type 1 configured grant is configured, may be determined. In the embodiment illustrated in FIG. 8, it is assumed that the past time point 840 is determined to be nearer to the time point at which configuration of the type 1 configured grant is performed. The time domain offset value may be determined, by a base station, by considering HARQ and ARQ retransmission of the RRC configuration/reconfiguration message.

Here, the transmission time point of the N-th type 1 configured grant (N is a non-negative integer value) may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) \bmod (1024 \times numberOfSlotsPerFrame \times numberOfSymbolsPerSlot) \quad <\text{Equation 7}>$$

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, and "symbol number in the slot" is the symbol number in the slot. In <Equation 7>, it has been assumed that there are 1024 frames, each frame has a length of 10 ms, and the unit of periodicity is a symbol. However, even if a unit is changed or an offset value added as a constant occurs according to embodiments, the subject matter of the disclosure can be applied in the same manner.

Considering <Equation 7>, a transmission time point of the 0th (N=0) configured grant may be the transmission time point 801, a transmission time point of the first (N=1) configured grant may be the transmission time point 802, and a transmission time point of the second (N=2) configured grant may be the transmission time point 803, and the like. By applying the manner discussed above, the terminal can constantly determine transmission time points of the type 1 configured grant even if the offset length from the SFN start time point (SFN=0) is changed. In this case, the type 1 configured grant transmission time points 801 and 802 prior to the time point 860 at which configuration of the type 1 configured grant is performed may not be actually used. In this case, the type 1 configured grant for which a frame number is 2 (N=2) and a transmission time point is the time point 803 may be actually used first.

Here, since the terminal identifies the time point 860 at which configuration of the type 1 configured grant is performed, the type 1 configured grant actually used for transmission may be a type 1 configured grant resource applied after the time point 860. The transmission time point of the 0th (N=0) type 1 configured grant may be defined based on actually usable resources, and thereafter, the transmission time point of the Nth type 1 configured grant may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (SFNref + timeDomainOffset \times numberOfSymbolsPerSlot + S + (N+m) \times periodicity) \bmod (1024 \times numberOfSlotsPerFrame \times numberOfSymbolsPerSlot) \quad <\text{Equation 8-1}>$$

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + m \times periodicity) \bmod (1024 \times numberOfSlotsPerFrame \times numberOfSymbolsPerSlot) \quad <\text{Equation 8-2}>$$

In the embodiment illustrated in FIG. 8, the SFN, the slot number in the frame, and the symbol number in the slot for the transmission time point of the first configured grant after the time point at which configuration of the type 1 configured grant is performed satisfy a condition "m=2".

As shown in FIG. 8, a base station may configure whether to change the offset from a time point at which the SFN is 0 (SFN=0) in order to make the periodicity 800 of the type 1 configured grant to be constant. For example, the constant periodicity may be applied only when the continuous indicator (ContinueIndicator) is configured, and if not, the offset may be applied equally to every SFN start time point (SFN=0).

Figure 9:
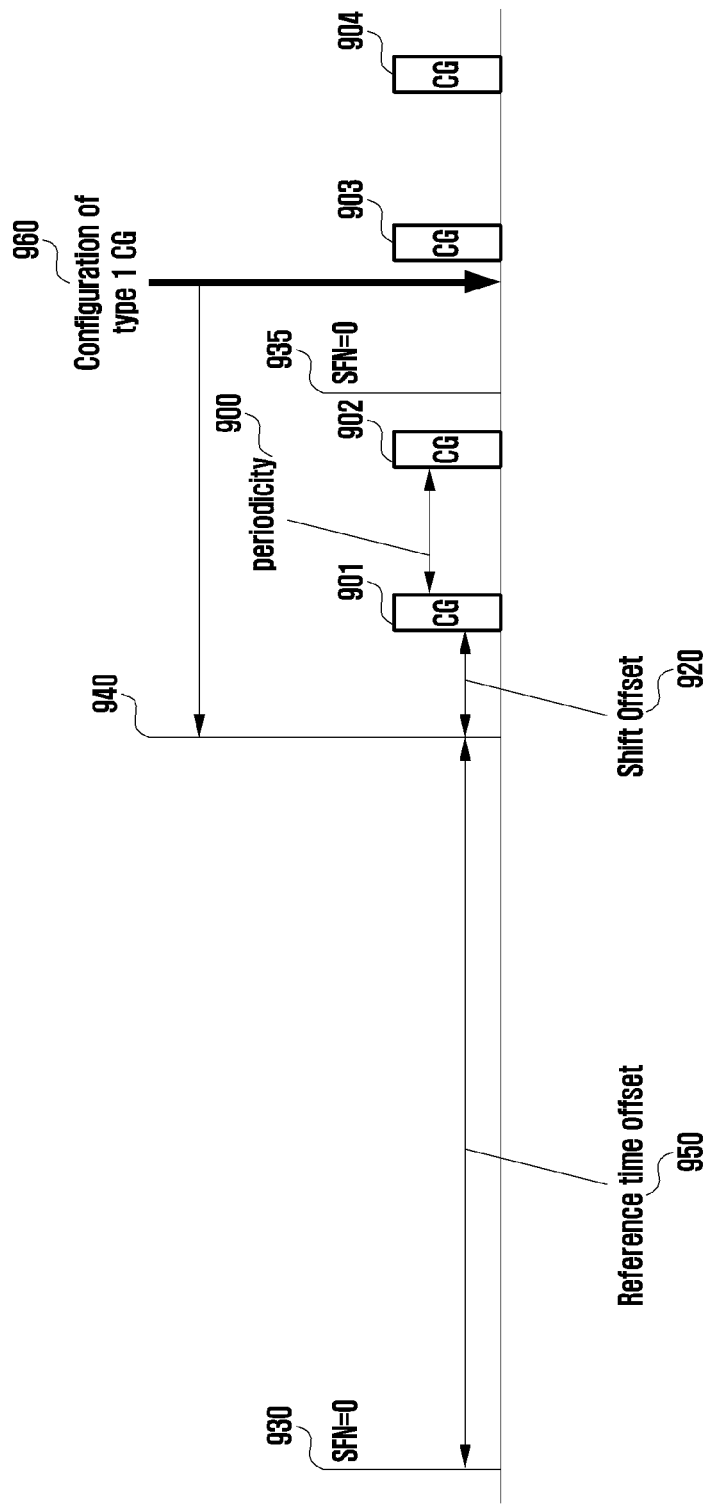
FIG. 9 illustrates a reference time application method proposed in the disclosure.

FIG. 9 illustrates a reference time application method proposed in the disclosure.

As described in FIGS. 2, 3, and 4, if a time point 960 at which a terminal applies the type 1 configured grant is adjacent to an SFN start time point (SFN=0) 935, the SFN start time point (SFN=0) applied by the terminal may differ from a time point configured by a base station. This problem may occur because an offset 920 is always applied based on the SFN start time point (SFN=0).

In order to prevent this problem, the terminal may explicitly configure a time point 940 indicated by a reference time offset, as a reference time point at which an offset of the type 1 configured grant is applied. The embodiment illustrated in FIG. 9 relates to a method of applying a shift offset at a time 950, indicated by the reference time offset, rather than a time point at which the SFN is 0 (SFN=0).

To this end, a reference time offset value and a shift offset value need to be configured by a base station. Here, the terminal may apply a shift offset 920, based on a time point 940 indicated by a reference time offset of the nearest past time point with reference to the time point 960 at which configuration of the type 1 configured grant is performed, and then may determine transmission time points 901, 902, 903, and 904 of the type 1 configured grant at every predetermined periodicity 900.

The reference time offset and shift offset value may be determined, by a base station, by considering HARQ and ARQ retransmission of the RRC configuration/reconfiguration message. In some embodiments, the shift offset may be determined as 0.

Here, the transmission time point of the N-th type 1 configured grant (N is a non-negative integer value) may satisfy the following equation.

$$[(SFN \times numberOfSlotsPerFrame \times numberOfSymbolsPerSlot) + (\text{slot number in the frame} \times numberOfSymbolsPerSlot) + \text{symbol number in the slot}] = (referenceTimeOffset \times numberOfSymbolsPerSlot + shiftOffset + N \times periodicity) \bmod (1024 \times numberOfSlotsPerFrame \times numberOfSymbolsPerSlot) \quad <\text{Equation 9}>$$

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, and "symbol number in the slot" is the symbol number in the slot. In <Equation 9>, it has been assumed that there are 1024 frames, each frame has a length of 10 ms, and the unit of periodicity is a symbol. However, even if a unit is changed or an offset value added as a constant occurs according to embodiments, the subject matter of the disclosure can be applied in the same manner.

Considering <Equation 9>, a transmission time point of the 0th (N=0) configured grant may be the transmission time point 901, a transmission time point of the first (N=1) configured grant may be the transmission time point 902, and a transmission time point of the second (N=2) configured grant may be the transmission time point 903, and the like. By applying the manner discussed above, the terminal can constantly determine transmission time points of the type 1 configured grants even if the offset length from the SFN start time point (SFN=0) is changed. In this case, the type 1 configured grant transmission time points 901 and 902 prior to the time point 960 at which configuration of the type 1 configured grant is performed may not be actually used. In this case, the type 1 configured grant for which a frame number (N=2) and a transmission time point is the time point 903 may be actually used first.

Here, since the terminal identifies the time point 960 at which configuration of the type 1 configured grant is performed, the type 1 configured grant actually used for transmission may be a type 1 configured grant resource applied after the time point 960. The transmission time point of the 0th (N=0) type 1 configured grant may be defined based on actually usable resources, and thereafter, the transmission time point of the Nth type 1 configured grant may satisfy the following equation.

[(SFN×numberOfSlotsPerFrame×numberOfSymbolsPerSlot)+(slot number in the frame×numberOfSymbolsPerSlot)+symbol number in the slot]=(referenceTimeOffset×numberOfSymbolsPerSlot+shiftOffset+(*N*+*m*)×periodicity)modulo (1024×numberOfSlotsPerFrame×numberOfSymbolsPerSlot)  <Equation 10-1>

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

[(SFN×numberOfSlotsPerFrame×numberOfSymbolsPerSlot)+(slot number in the frame×numberOfSymbolsPerSlot)+symbol number in the slot]=(referenceTimeOffset×numberOfSymbolsPerSlot+shiftOffset+*m*×periodicity)modulo (1024×numberOfSlotsPerFrame×numberOfSymbolsPerSlot)  <Equation 10-2>

In the embodiment illustrated in FIG. 9, the SFN, the slot number in the frame, and the symbol number in the slot for the transmission time point of the first configured grant after the time point at which configuration of the type 1 configured grant is performed satisfy a condition "m=2".

As shown in FIG. 9, a base station may configure whether to change an offset from a time point at which the SFN is 0 (SFN=0) in order to make the periodicity 900 of the type 1 configured grant to be constant. For example, the constant periodicity may be applied only when the continuous indicator (ContinueIndicator) is configured, and if not, the offset may be applied equally to every SFN start time point (SFN=0).

Figure 10:
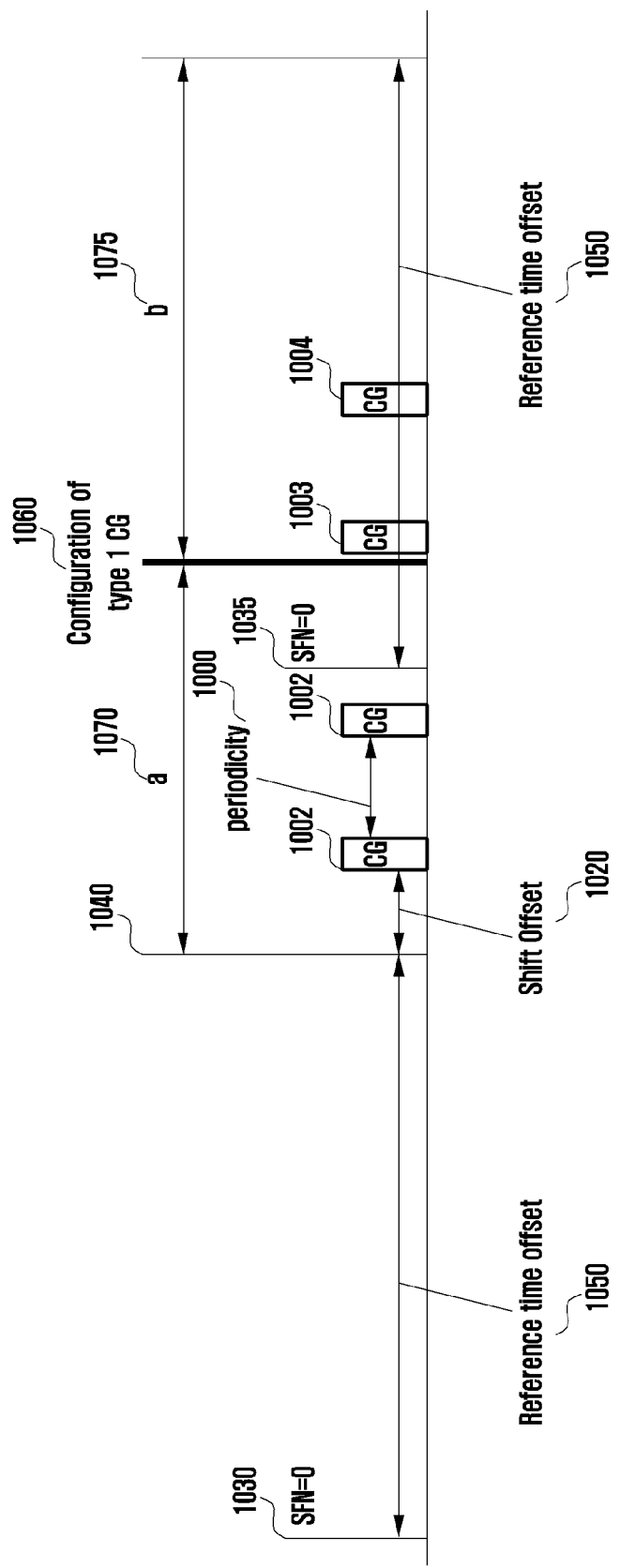
FIG. 10 illustrates a reference SFN application method proposed in the disclosure.

FIG. 10 illustrates a reference SFN application method proposed in the disclosure.

As described in FIGS. 2, 3, and 4, if a time point 1060 at which a terminal applies the type 1 configured grant is adjacent to an SFN start time point (SFN=0) 1035, the SFN start time point (SFN=0) applied by the terminal may differ from a time point configured by a base station. This problem may occur because an offset 1020 is always applied based on the SFN start time point (SFN=0).

In order to prevent this problem, the terminal may explicitly configure a time point 1040 indicated by a reference time offset, as a reference time point at which an offset of the type 1 configured grant is applied. The embodiment illustrated in FIG. 10 relates to a method of applying a shift offset at a time 1050, indicated by a reference time offset, rather than a time point at which the SFN is 0 (SFN=0).

To this end, a reference time offset value and a shift offset value need to be configured by a base station. Here, the terminal may apply a shift offset 1020, based on a time point indicated by a reference time offset of the nearest past or future time point with reference to a time point 1060 at which configuration of the type 1 configured grant is performed, and then may determine transmission time points 1001, 1002, 1003, and 1004 of the type 1 configured grant at every predetermined periodicity 1000. Here, by comparing distances 1070 and 1075 from a time point, at which the type 1 configured grant is configured, to a time point indicated by each reference time offset, a time point, which is indicated by a time offset of a time point nearer to the time point at which the type 1 configured grant is configured, may be determined. In the embodiment illustrated in FIG. 10, it is assumed that the past time point 1040 is determined to be nearer to the time point at which configuration of the type 1 configured grant is performed.

The reference time offset and shift offset value may be determined, by a base station, by considering HARQ and ARQ retransmission of the RRC configuration/reconfiguration message. In some embodiments, the shift offset may be determined as 0.

Here, the transmission time point of the N-th type 1 configured grant (N is a non-negative integer value) may satisfy the following equation.

[(SFN×numberOfSlotsPerFrame×numberOfSymbolsPerSlot)+(slot number in the frame×numberOfSymbolsPerSlot)+symbol number in the slot]=(referenceTimeOffset×numberOfSymbolsPerSlot+shiftOffset+*N*×periodicity)modulo (1024×numberOfSlotsPerFrame×numberOfSymbolsPerSlot)  <Equation 11>

Here, "SFN" is the current SFN value, "numberOfSlotsPerFrame" is the number of slots for each frame, "numberOfSymbolsPerSlot" is the number of symbols for each slot, "slot number in the frame" is the slot number in the frame, and "symbol number in the slot" is the symbol number in the slot. In <Equation 11>, it has been assumed that there are 1024 frames, each frame has a length of 10 ms, and the unit of periodicity is a symbol. However, even if a unit is changed or an offset value added as a constant occurs according to embodiments, the subject matter of the disclosure can be applied in the same manner.

Considering <Equation 11>, a transmission time point of the 0th (N=0) configured grant may be the transmission time point 1001, a transmission time point of the first (N=1) configured grant may be the transmission time point 1002, and a transmission time point of the second (N=2) configured grant may be the transmission time point 1003, and the like. By applying the manner discussed above, the terminal can constantly determine transmission time points of the type 1 configured grants even if the offset length from the SFN start time point (SFN=0) is changed. In this case, the type 1 configured grant transmission time points 1001 and 1002 prior to the time point 1060 at which configuration of the type 1 configured grant is performed may not be actually used. In this case, the type 1 configured grant for which a frame number is 2 (N=2) and a transmission time point is the time point 1003 may be actually used first.

Here, since the terminal identifies the time point 1060 at which configuration of the type 1 configured grant is performed, the type 1 configured grant actually used for transmission may be a type 1 configured grant resource applied after the time point. The transmission time point of the 0th (N=0) type 1 configured grant may be defined based on actually usable resources, and thereafter, the transmission time point of the Nth type 1 configured grant may satisfy the following equation.

$$[(\text{SFN} \times \text{numberOfSlotsPerFrame} \times \text{numberOfSymbolsPerSlot}) + (\text{slot number in the frame} \times \text{numberOfSymbolsPerSlot}) + \text{symbol number in the slot}] = (\text{referenceTimeOffset} \times \text{numberOfSymbolsPerSlot} + \text{shiftOffset} + (N+m) \times \text{periodicity}) \bmod (1024 \times \text{numberOfSlotsPerFrame} \times \text{numberOfSymbolsPerSlot})$$
<Equation 12>

Here, m is an integer value satisfying the time point (SFN, slot number in the frame, symbol number in the slot) of the first configured grant resource after the time point at which configuration of the type 1 configured grant is performed. In other words, m is the minimum non-zero integer that satisfies the following equation.

$$[(\text{SFN} \times \text{numberOfSlotsPerFrame} \times \text{numberOfSymbolsPerSlot}) + (\text{slot number in the frame} \times \text{numberOfSymbolsPerSlot}) + \text{symbol number in the slot}] = (\text{referenceTimeOffset} \times \text{numberOfSymbolsPerSlot} + \text{shiftOffset} + m \times \text{periodicity}) \bmod (1024 \times \text{numberOfSlotsPerFrame} \times \text{numberOfSymbolsPerSlot})$$
<Equation 12-2>

In the embodiment illustrated in FIG. 10, the SFN, the slot number in the frame, and the symbol number in the slot for the transmission time point of the first configured grant after the time point at which configuration of the type 1 configured grant is performed satisfy a condition "m=2".

As shown in FIG. 10, a base station may configure whether to change an offset from a time point at which the SFN is 0 (SFN=0) in order to make the periodicity 1000 of the type 1 configured grant to be constant. For example, the constant periodicity may be applied only when the continuous indicator (ContinueIndicator) is configured, and if not, the offset may be applied equally to every SFN start time point (SFN=0).

Figure 11:
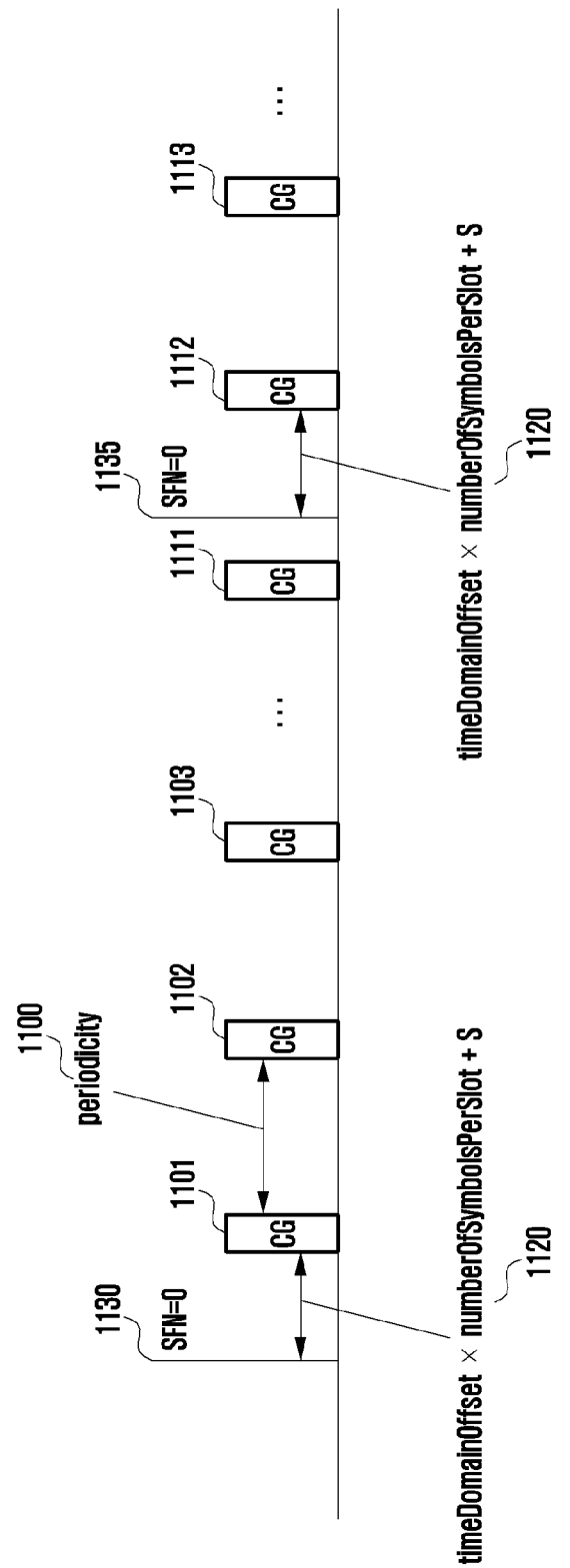
FIG. 11 illustrates a method of determining a transmission time point of a configured grant again at every frame (SFN=0)

FIG. 11 illustrates a method of determining a transmission time point of a configured grant again at every SFN (SFN=0).

As described in FIGS. 2, 3, and 4, a time from every SFN start time point (SFN=0) to the transmission time point of the first type 1 configured grant may be changed by the periodicity of the type 1 configured grant. In order to solve this problem, the terminal may determine the transmission time point of the type 1 configured grant by applying (as indicated by reference numeral 1120) the offset value again to every SFN start time points (SFN=0) 1130 and 1135. In this case, with reference to the last SFN start time point (SFN=0) 1135 just before the configured grant 1112, the interval between a configured grant 1111 just before the start time point 1135 and a configured grant 1112 just after the start time point 1135 may not coincide with the periodicity 1100. However, the terminal may not differently understand the transmission time point of the type 1 configured grant according to the configuration time by a base station.

The method proposed in the embodiment illustrated in FIG. 11 may be applied only to the case where there is no problem in satisfying quality of service (QoS) requirements of the terminal even if the periodicity of the type 1 configured grant is not guaranteed. To this end, a separate configuration may be applied. For example, an offset may be newly applied to every SFN start time point (SFN=0) only when a continue indicator is not configured.

Figure 12:
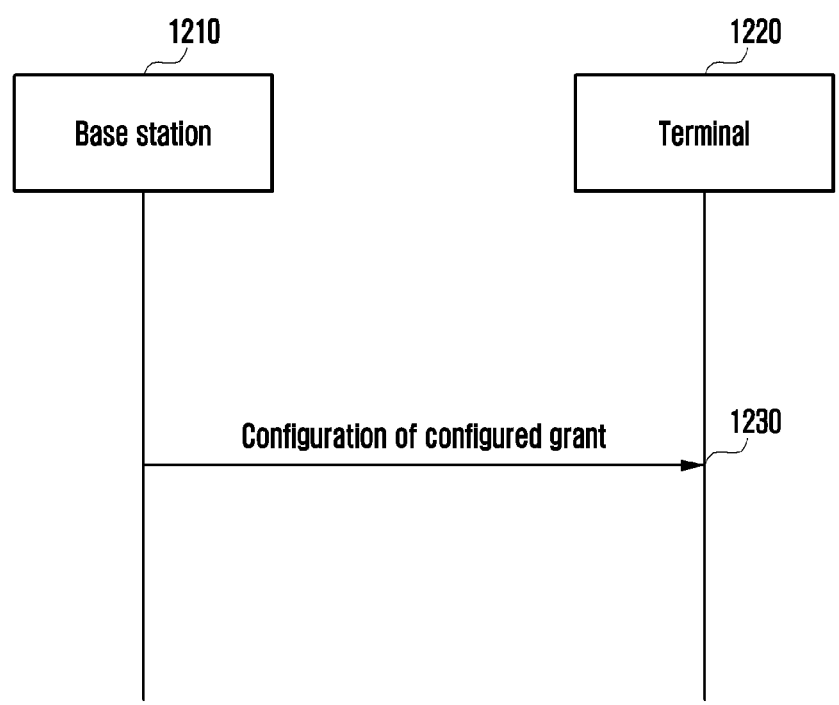
FIG. 12 illustrates a method in which a type 1 configured grant is configured.

FIG. 12 illustrates a method of configuring a type 1 configured grant.

A base station 1210 may configure a type 1 configured grant for a terminal 1220 in the form of an RRC configuration/reconfiguration message (indicated by reference numeral 1230). The message may indicate whether the configured grant, configuration of which has been performed, is a type 1 CG or a type 2 CG. In addition, values such as a periodicity of a configured grant, a time domain offset, and a reference SFN may be configured together based on the message. Based on the information described above, the terminal may apply the configuration of the configured grant at a time point at which the corresponding configuration message 1230 is received. If the configured grant is the type 1 configured grant, configuration thereof can be activated immediately and the corresponding configured grant can be used.

Figure 13:
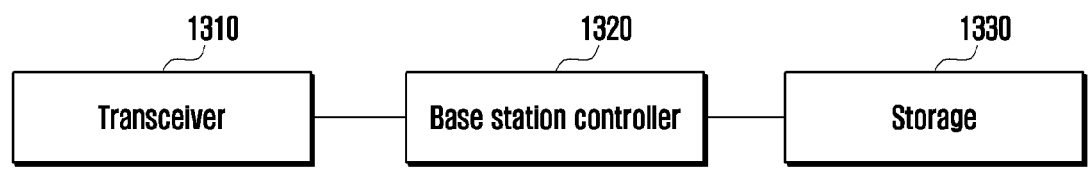
FIG. 13 illustrates the structure of a base station according to an embodiment.

FIG. 13 illustrates the structure of a base station according to an embodiment.

Referring to FIG. 13, the base station may include a transceiver 1310, a controller 1320, and a storage 1330. In the disclosure, the controller 1320 may be defined as a circuit- or an application-specific integrated circuit or at least one processor.

The transceiver 1310 may transmit or receive a signal to or from another network entity. The transceiver 1310 may transmit system information to a terminal, for example, and may transmit a synchronization signal or a reference signal thereto. In addition, according to an embodiment, the transceiver 1310 may transmit an RRC message including the configuration of a type 1 configured grant to the terminal.

The controller 1320 may control an overall operation of the base station according to the embodiment proposed in the disclosure. For example, the controller 1320 may control a signal flow between respective blocks to perform the operation of the disclosure described above.

The storage 1330 may store at least one of information transmitted or received through the transceiver 1310 and information generated through the controller 1320.

Figure 14:
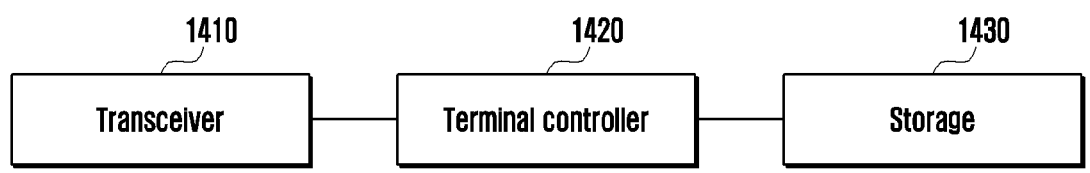
FIG. 14 illustrates the structure of a terminal according to an embodiment.

FIG. 14 illustrates the structure of a terminal according to an embodiment.

Referring to FIG. 14, the terminal may include a transceiver 1410, a controller 1420, and a storage 1430. In the disclosure, the controller may be defined as a circuit- or an application-specific integrated circuit or at least one processor.

The transceiver 1410 may transmit or receive a signal to or from another network entity. The transceiver 1410 may receive system information from, for example, a base station, and may receive a synchronization signal or a reference signal therefrom. In addition, according to an embodiment, the transceiver 1410 may receive an RRC message including configuration of the type 1 configured grant from the base station.

The controller 1420 may control an overall operation of the terminal according to the embodiment proposed in the disclosure. For example, the controller 1420 may control a signal flow between respective blocks to perform the operation of the disclosure described above.

The storage 1430 may store at least one of information transmitted or received through the transceiver 1410 and information generated through the controller 1420.

Those skilled in the art will appreciate that other embodiments of the disclosure may be implemented without changing the technical idea or essential features of the disclosure. Therefore, in all aspects, the embodiments disclosed herein should be considered not from limitative viewpoints but from illustrative viewpoints. The scope of the disclosure should be determined not by the above detailed description but by the appended claims, and all changes or modifications derived from the meaning and scope of the claims and equivalent concepts thereof shall be construed as falling within the scope of the disclosure.

Although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, configuration information on a configured grant including first information on an offset and second information on a time reference system frame number (SFN);
   identifying a resource for initializing the configured grant based on the offset and a first SFN for which the offset is applied;
   identifying whether a continue indicator associated with a transmission for the configured grant is configured;
   in case that the continue indicator is configured, performing a first type transmission for the configured grant initialized in the identified resource based on a periodicity, wherein the first SFN is determined as a closest SFN with a number indicated by the second information preceding a reception of the configuration information; and
   in case that the continue indicator is not configured, performing a second type transmission for the configured grant initialized in the identified resource based on the periodicity until a next SFN with a number of 0,
   wherein, after the next SFN with the number of 0, the second type transmission for the configured grant is initiated based on a second SFN and performed based on the periodicity, and
   wherein the second SFN is obtained by applying the offset to every SFN with the number of 0.

2. The method of claim 1,
   wherein the configuration information further includes third information associated with a symbol length, and
   wherein the third information is used to determine a symbol for the identified resource.

3. The method of claim 1,
   wherein the configuration information is received by a radio resource control (RRC) message, and
   wherein the configured grant is a configured grant type 1.

4. The method of claim 3,
   wherein the RRC message further includes information on the periodicity.

5. A method performed by a base station in a wireless communication system, the method comprising:
   transmitting, to a terminal, configuration information on a configured grant including first information on an offset and second information on a time reference system frame number (SFN); and
   receiving, from the terminal, data for the configured grant initialized in a resource,
   wherein the resource is identified based on the offset and a first SFN for which the offset is applied, and the first SFN is determined as a closest SFN system frame number with a number indicated by the second information preceding a reception of the configuration information by the terminal,
   wherein, in case that the base station configures a continue indicator associated with a transmission for the configured grant, the data for the configured grant is received based on a periodicity,
   wherein, in case that the base station does not configure the continue indicator associated with the transmission for the configured grant, the data for the configured grant is received based on the periodicity until a next SFN with a number of 0, and after the next SFN with the number of 0, a reception of the data for the configured grant is initiated based on a second SFN and performed based on the periodicity, and
   wherein the second SFN is obtained by applying the offset to every SFN with the number of 0.

6. The method of claim 5,
   wherein the configuration information further includes third information associated with a symbol length, and
   wherein the third information is used to determine a symbol for the identified resource.

7. The method of claim 5,
   wherein the configuration information is transmitted by a radio resource control (RRC) message, and
   wherein the configured grant is a configured grant type 1.

8. The method of claim 7,
   wherein the RRC message further includes information on the periodicity.

9. A terminal in a wireless communication system, the terminal comprising:
   a transceiver; and
   a controller configured to:
      control the transceiver to receive, from a base station, configuration information on a configured grant including first information on an offset and second information on a time reference system frame number (SFN);
      identify a resource for initializing the configured grant based on the offset and a first SFN for which the offset is applied;
      identify whether a continue indicator associated with a transmission for the configured grant is configured;
      in case that the continue indicator is configured, perform a first type transmission for the configured grant initialized in the identified resource based on a periodicity, wherein the first SFN is determined as a closest SFN with a number indicated by the second information preceding a reception of the configuration information; and
      in case that the continue indicator is not configured, perform a second type transmission for the configured grant initialized in the identified resource based on the periodicity until a next SFN with a number of 0,
      wherein, after the next SFN with the number of 0, the second type transmission for the configured grant is initiated based on a second SFN and performed based on the periodicity, and
      wherein the second SFN being determined by applying the offset to every SFN with the number of 0.

10. The terminal of claim 9,
    wherein the configuration information further includes third information associated with a symbol length, and wherein the controller is further configured to determine a symbol for the identified resource using the third information.

11. The terminal of claim 9,
wherein the configuration information is received by a radio resource control (RRC) message, and
wherein the configured grant is a configured grant type 1.

12. The terminal of claim 11,
wherein the RRC message further includes information on a periodicity.

13. A base station in a wireless communication system, the base station comprising:
a transceiver; and
a controller configured to:
control the transceiver to transmit, to a terminal, configuration information on a configured grant including first information on an offset and second information on a time reference system frame number (SFN); and
control the transceiver to receive, from the terminal, data for the configured grant initialized in a resource,
wherein the resource is identified based on the offset and a first SFN for which the offset is applied, and the first SFN is determined as a closest SFN with a number indicated by the second information preceding a reception of the configuration information by the terminal,
wherein, in case that the base station configures a continue indicator associated with a transmission for the configured grant, the data for the configured grant is received based on a periodicity,
wherein, in case that the base station does not configure the continue indicator associated with the transmission for the configured grant, the data for the configured grant is received based on the periodicity until a next SFN with a number of 0, and after the next SFN with the number of 0, a reception of the data for the configured grant is initiated based on a second SFN and performed based on the periodicity, and
wherein the second SFN is obtained by applying the offset to every SFN with the number of 0.

14. The base station of claim 13,
wherein the configuration information further includes third information associated with a symbol length, and
wherein the third information is used to determine a symbol for the identified resource.

15. The base station of claim 13,
wherein the configuration information is transmitted by a radio resource control (RRC) message, and
wherein the configured grant is a configured grant type 1.

16. The base station of claim 15,
wherein the RRC message further includes information on the periodicity.

* * * * *